United States Patent
Sumita

(10) Patent No.: US 7,861,202 B2
(45) Date of Patent: Dec. 28, 2010

(54) CELL ARRANGEMENT METHOD FOR DESIGNING SEMICONDUCTOR INTEGRATED CIRCUIT

(75) Inventor: Masaya Sumita, Hyogo (JP)

(73) Assignee: Panasonic Corporation, Osaka (JP)

( * ) Notice: Subject to any disclaimer, the term of this patent is extended or adjusted under 35 U.S.C. 154(b) by 634 days.

(21) Appl. No.: 11/798,985

(22) Filed: May 18, 2007

(65) Prior Publication Data
US 2007/0271541 A1 Nov. 22, 2007

(30) Foreign Application Priority Data
May 18, 2006 (JP) .............................. 2006-138856

(51) Int. Cl.
*G06F 17/50* (2006.01)
(52) U.S. Cl. ........................................... 716/9; 716/10
(58) Field of Classification Search ................. 716/8–11
See application file for complete search history.

(56) References Cited
U.S. PATENT DOCUMENTS

| | | | | |
|---|---|---|---|---|
| 6,308,305 B1 * | 10/2001 | Sugiyama et al. | ............. | 716/6 |
| 6,823,501 B1 * | 11/2004 | Dahl | ............. | 716/9 |
| 6,859,917 B2 * | 2/2005 | Shimazaki et al. | ............. | 716/17 |
| 7,117,469 B1 * | 10/2006 | Dahl | ............. | 716/11 |
| 2002/0079927 A1 | 6/2002 | Katoh et al. | | |
| 2004/0025135 A1 | 2/2004 | Hart et al. | | |
| 2005/0280437 A1 | 12/2005 | Lewis et al. | | |

FOREIGN PATENT DOCUMENTS

JP    11-068045    3/1999

OTHER PUBLICATIONS

Kuroda et al., "A High-Speed Low-Power 0.3μm CMOS Gate Array with Variable Threshold Voltage (VT) Scheme," Semiconductor Device Engineering Laboratory, Toshiba Corp., IEEE, 1996, Kawasaki, Japan.

* cited by examiner

*Primary Examiner*—Jack Chiang
*Assistant Examiner*—Binh C Tat
(74) *Attorney, Agent, or Firm*—McDermott Will & Emery LLP

(57) ABSTRACT

Logic circuit information in which flip-flops of a semiconductor integrated circuit subjected to designing and a logic circuit between flip-flops are defined is input. The logic circuit information is analyzed to detect a logic circuit sandwiched by two flip-flops. The number of logic stages of the detected logic circuit is counted. It is determined, according to the counted number of logic stages, to which substrate potential a cell used for the logic circuit is to be connected.

9 Claims, 5 Drawing Sheets

CELL ARRANGEMENT METHOD FOR DESIGNING SEMICONDUCTOR INTEGRATED CIRCUIT

CROSS-REFERENCE TO RELATED APPLICATIONS

This application claims priority under 35 U.S.C. §119(a) on Japanese Patent Application No. 2006-138856 filed on May 18, 2006, the entire contents of which are hereby incorporated by reference.

BACKGROUND OF THE INVENTION

The present invention relates to a semiconductor integrated circuit which has at least two independent substrates of the same polarity and specifically to area reduction and power consumption reduction techniques.

In some semiconductor integrated circuits, the substrate potential of a MOS element (MOS transistor) is controlled. This is because of such a characteristic that the threshold and saturation current property of the MOS element can be rendered variable by changing the substrate potential of the MOS element. An example which takes full advantage of the characteristic is such that the threshold and saturation current property are rendered variable at the times of operation and stoppage of the semiconductor integrated circuit. Specifically, during the operation of the semiconductor integrated circuit, the difference between the substrate potential and the source potential of the MOS element is 0 while the difference between the substrate potential and the source potential is a large difference during the stoppage, so that the threshold of the MOS element is higher during the stoppage than during the operation, whereby the subthreshold leakage current of the MOS element is reduced, which leads to reduced power consumption (see T. Kuroda et. al., "A High-Speed Low-Power 0.3 um CMOS Gate Array with Variable Threshold Voltage Scheme" IEEE Custom Integrated Circuit Conference 1996 PP. 53-56). To achieve the above-described substrate control over the MOS element, a layout method with improved area efficiency of a semiconductor integrated circuit has been proposed (see Japanese Patent No. 3212915).

In the above-described conventionally-proposed techniques, unique supply of a substrate potential results in such a problem that a pass which need not to necessarily be fast becomes fast, and as a result, a leakage current is caused. For a semiconductor integrated circuit which has a plurality of different substrate potentials, there has been no method for realizing a layout arrangement while maintaining high speed with higher resolution or maintaining low power consumption and small area.

SUMMARY OF THE INVENTION

The present invention was conceived with the view of solving the above-described problems of the semiconductor integrated circuits, in particular with respect to power consumption. An objective of the present invention is to provide a semiconductor integrated circuit which has a smaller circuit area and whose circuit properties do not deteriorate.

A cell arrangement method according to the present invention includes the steps of: (a) inputting logic circuit information in which flip-flops of a semiconductor integrated circuit subjected to designing and a logic circuit of the semiconductor integrated circuit existing between flip-flops are defined; (b) analyzing the logic circuit information to detect a logic circuit sandwiched by two flip-flops; (c) counting the number of logic stages of the logic circuit detected at step (b); and (d) determining, according to the number of logic stages counted at step (c), to which substrate potential a cell used for the logic circuit is to be connected.

In the cell arrangement method, step (d) includes determining such that a cell used for a logic circuit having a larger number of logic stages is connected to a higher substrate potential while a cell used for a logic circuit having a smaller number of logic stages is connected to a lower substrate potential.

In the cell arrangement method, step (d) includes determining to which substrate potential a cell used for the logic circuit is to be connected based on the number of logic stages counted at step (c) and table information; and the table information include such information that to which substrate a cell is to be connected is specified according to the number of logic stages of the logic circuit so long as the number of logic stages is between predetermined values.

The cell arrangement method further includes, after steps (b) to (d) are performed on all of logic circuits sandwiched by two flip-flops in the logic circuit information, step (e) of performing an automatic arrangement/wiring process based on the substrate potential determined at step (d) to generate layout data.

Another cell arrangement method includes the steps of: (a) inputting logic circuit information in which flip-flops of a semiconductor integrated circuit subjected to designing and a logic circuit of the semiconductor integrated circuit existing between flip-flops are defined; (b) performing an automatic arrangement/wiring process based on the logic circuit information to generate preliminary layout data; (c) performing a timing verification based on the preliminary layout data to calculate delay information of each logic circuit; (d) analyzing the logic circuit information to detect a logic circuit sandwiched by two flip-flops; (e) calculating a delay of the logic circuit detected at step (d) based on the delay information calculated at step (c); and (f) determining, according to the delay calculated at step (e), to which substrate potential a cell used for the logic circuit is to be connected.

In the cell arrangement method, step (f) includes determining such that a cell used for a logic circuit having a larger delay is connected to a higher substrate potential while a cell used for a logic circuit having a smaller delay is connected to a lower substrate potential.

In the cell arrangement method, step (f) includes determining to which substrate potential a cell used for the logic circuit is to be connected based on the delay calculated at step (e) and table information; and the table information include such information that to which substrate a cell is to be connected is specified according to the delay of the logic circuit so long as the delay is between predetermined values.

The cell arrangement method further includes, after steps (d) to (f) are performed on all of logic circuits sandwiched by two flip-flops in the logic circuit information, step (g) of performing an automatic arrangement/wiring process based on the substrate potential determined at step (f) to generate layout data.

In the cell arrangement method, when an error occurs in a result of timing verification performed on the layout data, a cell is relocated to a substrate of a higher substrate voltage such that the cell is connected to a different substrate potential.

In the cell arrangement method, when an error occurs in a result of timing verification performed on the layout data, a contact of a cell with a substrate potential supply line is replaced such that the cell is connected to a different substrate potential.

A semiconductor integrated circuit according to the present invention includes a plurality of flip-flops and a plurality of logic circuits on a plurality of substrates connected to different substrate potential supply lines, wherein a MOS element constituting a logic circuit is supplied with a substrate potential which differs according to whether the number of logic circuits located between an output of a first one of the plurality of flip-flops and a signal line input to the first flip-flop or a second flip-flop is small or large.

With the above-described structures, the present invention realizes a semiconductor integrated circuit which has a smaller circuit area and whose circuit properties do not deteriorate, whereas conventionally the substrate potential uniformly increases in all passes so that the leakage current increases.

DESCRIPTION OF THE PREFERRED EMBODIMENTS

Hereinafter, embodiments of a semiconductor device according to the present invention will be described in detail with reference to the drawings.

Embodiment 1

Figure 1:
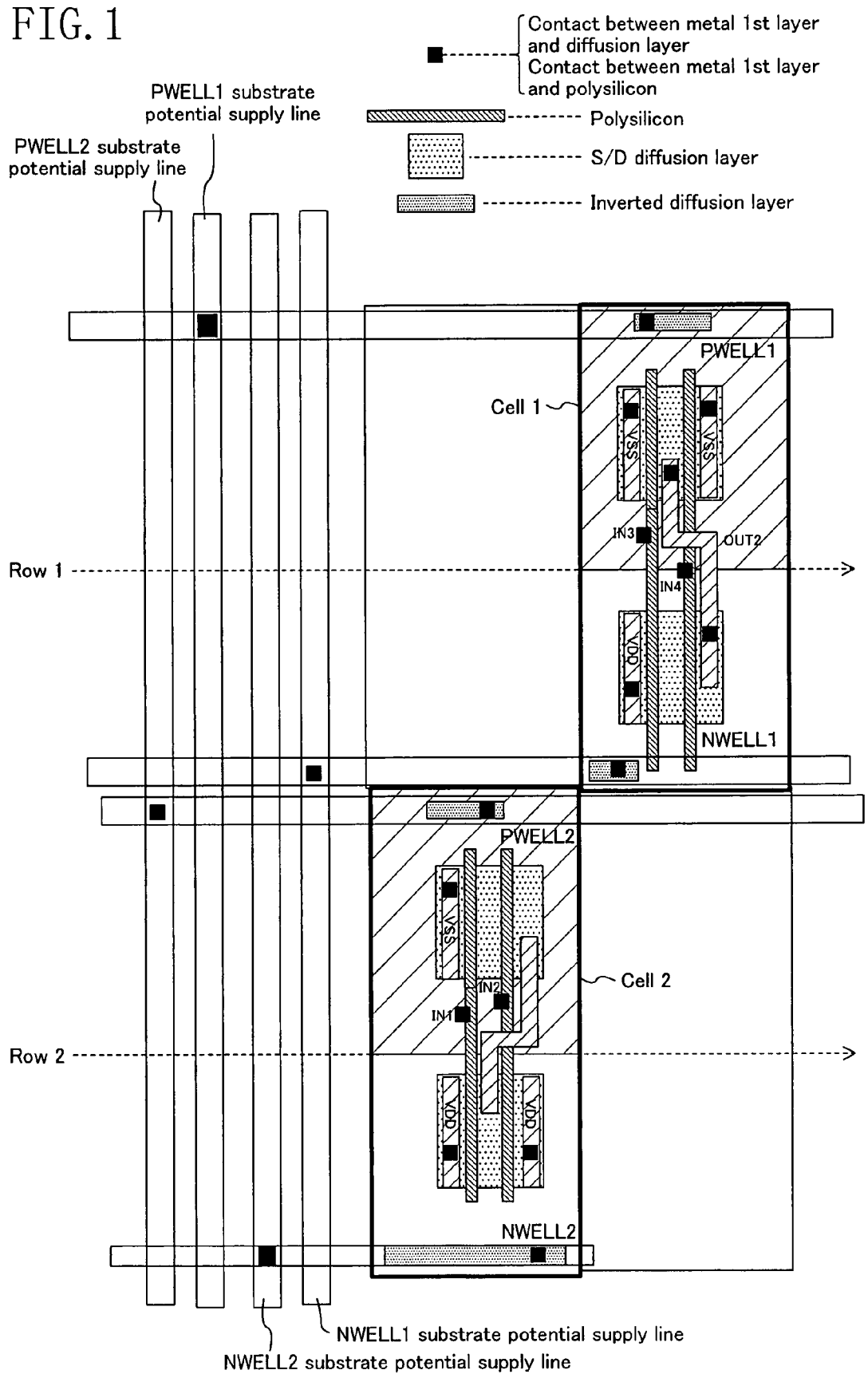
FIG. 1 shows a layout designed using cell arrangement methods of embodiments 1 and 2.

Embodiment 1 of the present invention is described with reference to the drawings. FIG. 1 shows a layout diagram of a semiconductor integrated circuit designed using a cell arrangement method of embodiment 1. In this semiconductor integrated circuit, PWELL (substrate of NMOS) is separated into PWELL1 and PWELL2, to which different substrate potentials can be supplied, and NWELL (substrate of PMOS) is separated into NWELL1 and NWELL2, to which different substrate potentials can be supplied. It should be noted that it is not necessary to separate the substrate for each row as shown in FIG. 1. As a matter of course, different substrate potentials can be supplied in other fashions, for example, by separating a substrate where a plurality of rows are grouped.

Herein, a row corresponding to PWELL1 and NWELL1 of FIG. 1 (Row 1) includes cells which are used for a logic circuit having a relatively large number of logic stages, while a row corresponding to PWELL2 and NWELL2 (Row 2) includes cells which are used for a logic circuit having a relatively small number of logic stages. In general, a semiconductor integrated circuit which realizes a function in synchronization with a clock has a complicated logic circuit between a signal line output from a flip-flop and a signal line input to the same or a different flip-flop. The number of logic stages which constitute this logic circuit varies according to the function. A larger number of logic stages results in a longer delay time between input and output of a signal. Thus, to meet the setup/hold restrictions of the flip-flop, a faster operation is desirable. Therefore, according to this embodiment, a cell having a larger number of logic stages is placed in a row which supplies a larger forward bias. Such an arrangement is capable of great reduction in drain leakage as compared with a conventional cell arrangement which is based on a unique substrate potential. Assuming that, for example, in FIG. 1, a cell 1 is a cell used for a logic circuit having 20 logic stages and a cell 2 is a cell used for a logic circuit having 8 logic stages, PWELL1 and NWELL1 supply a larger forward bias.

Figure 2:
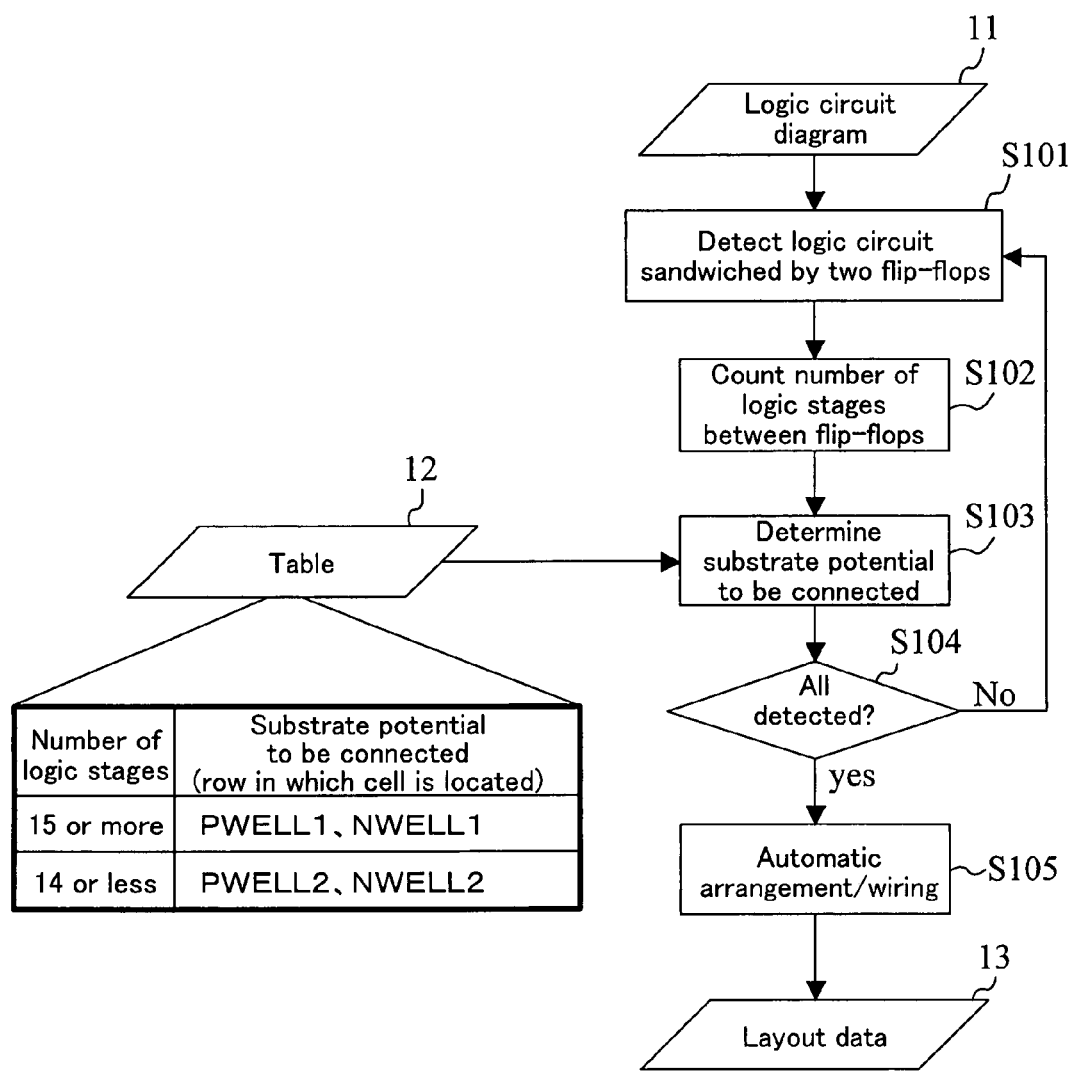
FIG. 2 is a flowchart illustrating the cell arrangement method of embodiment 1 of the present invention.

As for the flowchart for implementing the above-described cell layout, descriptions are added with reference to the drawings. FIG. 2 is a flowchart for embodiment 1 of the present invention. First, a logic circuit diagram 11 is input to a design supporting device which is capable of executing the flowchart of this embodiment. In the logic circuit diagram 11, flip-flops of a semiconductor integrated circuit which is a subject of designing and logic circuits of the semiconductor integrated circuit existing between such flip-flops are defined. At S101, this logic circuit diagram is analyzed to detect a logic circuit sandwiched by two flip-flops. Specifically, two flip-flops connected to each other with no other flip-flop interposed therebetween are detected, and a logic circuit is specified as a combinational circuit therebetween. Then, at S102, the number of logic stages of one logic circuit located between the detected two flip-flops is counted. The number of logic stages refers to, for example, the number of cells connected in series between the two flip-flops or the number of MOS transistors which are on the route for connection of the two flip-flops.

After the number of logic stages has been counted, at step S103, it is determined, based on the counted number of logic stages and table information 12, to which substrate potential a cell used for this logic circuit is to be connected, i.e., in this example, whether the cell is to be connected to PWELL1/NWELL1 or PWELL2/NWELL2. Namely, it is determined which row the cell is to be placed in. The table information 12 is such information that to which substrate a cell is to be connected is specified according to the number of logic stages of the logic circuit so long as the number of logic stages is between predetermined values, but is not limited to any specific form. After it has been determined to which substrate potential cells in one logic circuit are to be connected, a next logic circuit is detected, and it is determined to which substrate potential cells are to be connected.

The above-described procedure is repeated for all the intervals between flip-flops (S104), and at step S105, an automatic arrangement/wiring process is performed based on the determined substrate potentials to be connected, whereby layout data 13 is generated. This automatic arrangement/wiring process can be implemented in the same way as known methods, except that it is already determined in advance which substrate potential is to be connected. Namely, necessary cells are first arranged, and then, inputs and outputs of the cells are connected according to the logic circuit diagram, whereby the function of the semiconductor integrated circuit is realized. After preliminary arrangement and wiring once complete, the resultant circuit is subjected to verification (with respect to timing, antenna error, etc.), and the procedure of "preliminary arrangement and wiring", "verification" and "rearrangement and rewiring" is repeated till no error occurs in the verification result.

Designing according to the flowchart of this embodiment results in that a logic circuit having a larger number of logic stages is located in a row of a higher substrate potential, while a logic circuit having a smaller number of logic stages is located in a row of a lower substrate potential. Therefore, the drain leakage can be greatly reduced as compared with a conventional cell arrangement defined based on a unique substrate potential.

In the example described in this embodiment, NWELL1 and NWELL2 have different potentials. If NWELL1 and NWELL2 cannot have different potentials because of the structure of production process, however, NWELL1 and NWELL2 may have an equal potential. The same applies to PWELL1 and PWELL2.

Embodiment 2

In embodiment 2, an example where delay information which constitutes a logic are input is described, whereas the cell arrangement method based on the number of logic stages has been described in embodiment 1. A resultant layout of embodiment 2 is the same (i.e., the same as that of FIG. 1) except that the row is determined according to the number of logic stages or according to the delay information, and therefore, the descriptions thereof are herein omitted.

As for the flowchart for implementing the above-described cell layout, descriptions are added with reference to the drawings. FIG. 2 is a flowchart for embodiment 2 of the present invention.

First, a logic circuit diagram 11 is input to a design supporting device which is capable of executing the flowchart of this embodiment. In the logic circuit diagram 11, flip-flops of a semiconductor integrated circuit which is a subject of designing and logic circuits of the semiconductor integrated circuit existing between such flip-flops are defined. At S201, an automatic arrangement/wiring process is performed based on the logic circuit diagram using a known method. Specifically, necessary cells are first arranged, and then, inputs and outputs of the cells are connected according to the logic circuit diagram, whereby preliminary layout data 21 is generated. It should be noted herein that the substrate potential is common among all of the cells. At S202, the timing verification is performed based on the preliminary layout data 21 to calculate delay information of each logic circuit. At S203, a logic circuit sandwiched by two flip-flops is detected. Specifically, two flip-flops connected to each other with no other flip-flop interposed therebetween are detected, and a logic circuit is specified as a combinational circuit therebetween. Then, at S204, how much the delay of a target logic circuit is specified based on the delay information calculated at S202. Herein, the delay refers to a time period between input of a signal to the logic circuit and output of the signal from the logic circuit.

Figure 3:
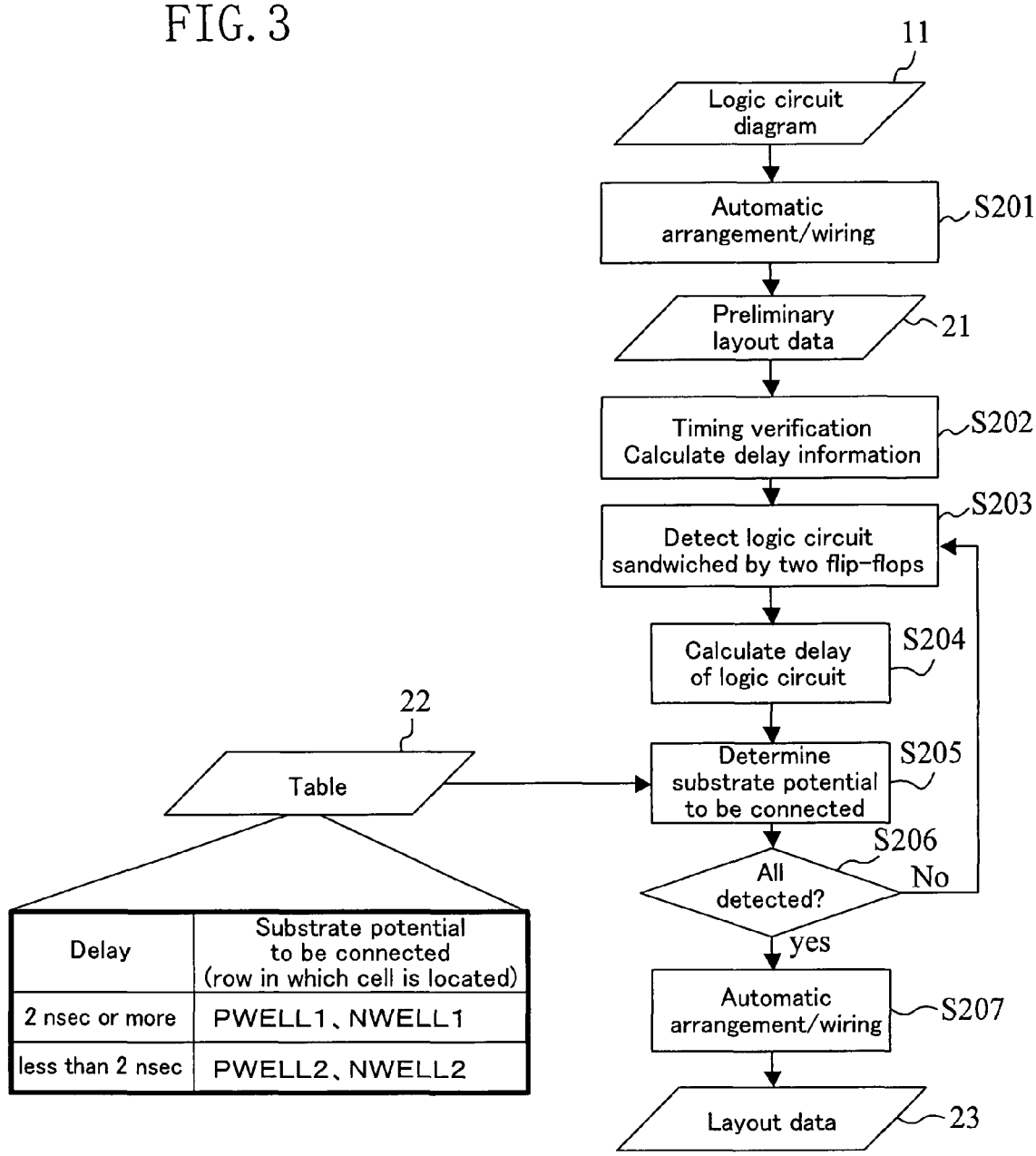
FIG. 3 is a flowchart illustrating the cell arrangement method of embodiment 2 of the present invention.

After the delay is calculated, at step S205, it is determined, based on the calculated delay and table information 12, to which substrate potential a cell used for this logic circuit is to be connected, i.e., in this example, whether the cell is to be connected to PWELL1/NWELL1 or PWELL2/NWELL2. Namely, it is determined which row the cell is to be placed in. The table information 22 contains information about to which substrate potential is to be connected according to the delay of the logic circuit as illustrated in FIG. 3. After it has been determined to which substrate potential cells in one logic circuit are to be connected, a next logic circuit is detected, and it is determined again to which substrate potential cells are to be connected.

The above-described procedure is repeated for all the intervals between flip-flops (S206), and at step S207, an automatic arrangement/wiring process is performed based on the determined substrate potentials to be connected, whereby layout data 23 is generated.

Designing according to the flowchart of this embodiment results in that a logic circuit having a larger delay time is located in a row of a higher substrate potential, while a logic circuit having a smaller delay time is located in a row of a lower substrate potential. Therefore, the drain leakage can be greatly reduced as compared with a conventional cell arrangement defined based on a unique substrate potential.

(Variation)

Figure 4:
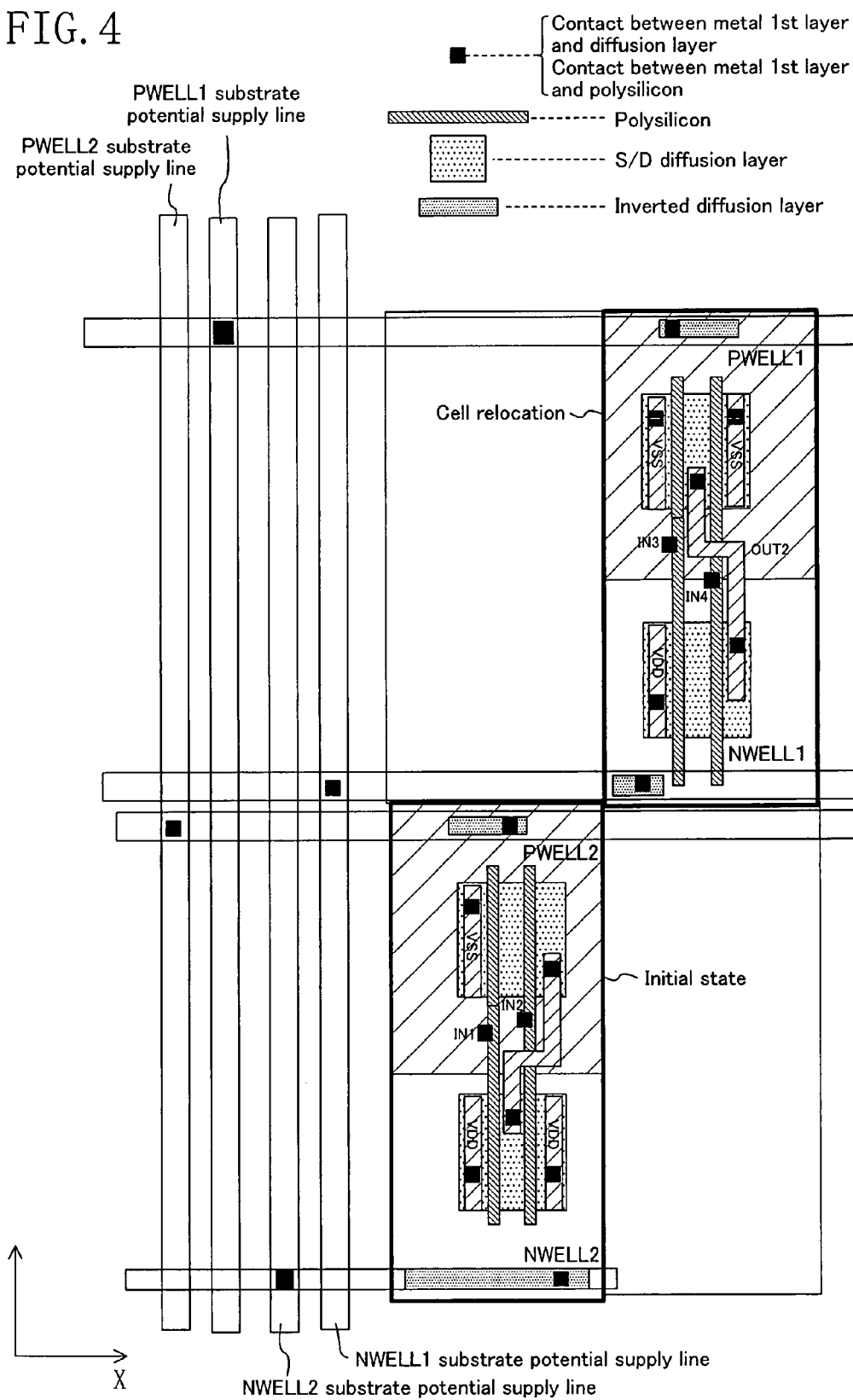
FIG. 4 shows a variation.

In the logic cell arrangement methods described in embodiments 1 and 2, if the timing verification performed after a layout is once prepared with two or more substrate potentials results in an error, the substrate potential to be connected may be changed. In such a case, the circuit can be re-designed according to the flowchart of embodiment 1 or 2. However, for example, if an adjacent row is supplied with a higher substrate potential (provided with a larger forward bias) and it is necessary to relocate a cell to that side, the relocation can be realized by flipping the cell to that row. In FIG. 4, a cell first connected to PWELL2 and NWELL2 is flipped to be relocated to adjacent PWELL1 and NWELL1.

When the whole of a row is demanded to be connected to a higher substrate potential, the contacts of a substrate potential supply line which constitutes a main line arranged in the vertical direction of the drawing (Y direction) and another substrate potential supply line arranged in the horizontal direction (X direction) along the cells are replaced, whereby the substrate potential to be connected can be changed within a short time period without relocation of cells.

(Design Environment)

Figure 5:
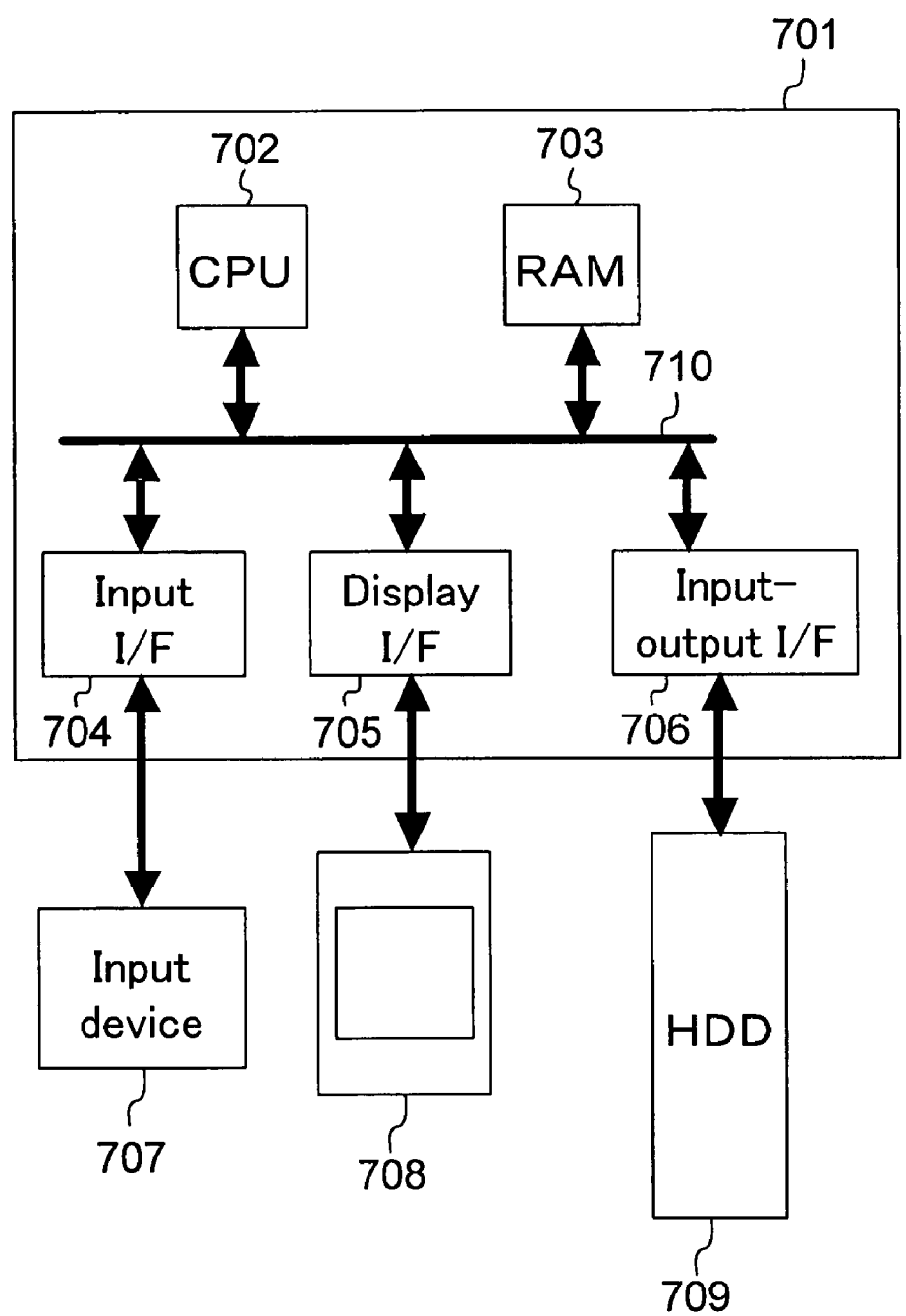
FIG. 5 shows a design environment in which the present invention is implemented.

Lastly, the design environment for implementation of the present invention is described. FIG. 5 shows a device used in a design environment in which the present invention is implemented. The design device 701 includes a CPU 702, an RAM 703, an input I/F 704, a display I/F 705, and an input-output I/F 706. All of these components are coupled together by a bus 710 and are capable of data communication with one another. The input I/F 704 is connected to an input device 707 which receives an input from a designer. Examples of the input device 707 include keyboard and mouse. The display I/F 705 is connected to a display device 708 through which a designer browses layout data and the like. Examples of the display device 708 include CRT display and liquid crystal display. The input-output I/F 706 is connected to a HDD (Hard Disk Drive) 709. In the HDD 709, an automatic layout tool for implementing a design method of the present invention is stored in the form of a program.

This automatic layout tool may be an independent tool or may be part of any other tool. Layout data in the midst of an automatic layout process or a finally-obtained layout data is stored in the HDD 709 when necessary.

The CPU 702 processes the automatic layout tool stored as the program in the HDD 709 based on an instruction from a user input through the input I/F 704. For the process of the program, the RAM 703 is used as a work region, in/from which data are written/read at necessary timings. A designer does not explicitly give an instruction to write/read data in/from the RAM 703 but gives an instruction such that writing/reading of data in/from the RAM is carried out according to the program stored in the HDD 709.

The designer can check progress information via the display device 708. Finally-obtained timing data is output to the HDD 709, and the layout design process including cell arrangement completes.

INDUSTRIAL APPLICABILITY

A cell arrangement method according to the present invention is very useful for a chip of a semiconductor integrated circuit which realizes high performance, low cost, small circuit area and small power consumption, so that a long battery life can be secured in a chip set which is powered by a future battery, or the like, and the circuit area can be reduced. Accordingly, a less-expensive semiconductor chip of higher performance can be provided to a chip set.

What is claimed is:

1. A cell arrangement method, comprising the steps of:
   (a) inputting logic circuit information in which flip-flops of a semiconductor integrated circuit subjected to designing and a logic circuit of the semiconductor integrated circuit existing between flip-flops are defined;
   (b) analyzing, by using a design device including a CPU, the logic circuit information to detect a logic circuit sandwiched by two flip-flops;
   (c) counting the number of logic stages of the logic circuit detected at step (b);
   (d) determining, according to the number of logic stages counted at step (c), to which substrate potential a cell used for the logic circuit is to be connected; and,
   after steps (b) to (d) are performed on all of logic circuits sandwiched by two flip-flops in the logic circuit information, step (e) of performing an arrangement/wiring process based on the substrate potential determined at step (d) to generate layout data.

2. The cell arrangement method of claim 1, wherein step (d) includes determining such that a cell used for a logic circuit having a larger number of logic stages is connected to a higher substrate potential while a cell used for a logic circuit having a smaller number of logic stages is connected to a lower substrate potential.

3. The cell arrangement method of claim 1, wherein:
   step (d) includes determining to which substrate potential a cell used for the logic circuit is to be connected based on the number of logic stages counted at step (c) and table information; and
   the table information include such information that to which substrate a cell is to be connected is specified according to the number of logic stages of the logic circuit so long as the number of logic stages is between predetermined values.

4. The cell arrangement method of claim 1, wherein the cell includes a plurality of cells, and at the step (d), each of the plurality of cells is connected to a different substrate potential.

5. The cell arrangement method of claim 1 wherein, when an error occurs in a result of timing verification performed on the layout data, a cell is relocated to a substrate of a higher substrate voltage such that the cell is connected to a different substrate potential.

6. The cell arrangement method of claim 1 wherein, when an error occurs in a result of timing verification performed on the layout data, a contact of a cell with a substrate potential supply line is replaced such that the cell is connected to a different substrate potential.

7. A cell arrangement method, comprising the steps of:
   (a) inputting logic circuit information in which flip-flops of a semiconductor integrated circuit subjected to designing and a logic circuit of the semiconductor integrated circuit existing between flip-flops are defined;
   (b) analyzing, by using a design device including a CPU, the logic circuit information to detect a logic circuit sandwiched by two flip-flops;
   (c) counting the number of logic stages of the logic circuit detected at step (b);
   (d) determining, according to the number of logic stages counted at step (c), to which substrate potential a cell used for the logic circuit is to be connected; and,
   after steps (b) to (d) are performed on all of logic circuits sandwiched by two flip-flops in the logic circuit information, step (e) of performing an automatic arrangement/wiring process based on the substrate potential determined at step (d) to generate layout data.

8. The cell arrangement method of claim 4 wherein, when an error occurs in a result of timing verification performed on the layout data, a cell is relocated to a substrate of a higher substrate voltage such that the cell is connected to a different substrate potential.

9. The cell arrangement method of claim 4 wherein, when an error occurs in a result of timing verification performed on the layout data, a contact of a cell with a substrate potential supply line is replaced such that the cell is connected to a different substrate potential.

* * * * *